United States Patent [19]

Klaassen et al.

[11] Patent Number: 5,168,395
[45] Date of Patent: Dec. 1, 1992

[54] CONTROLLED MAGNETIC RECORDING HEAD RELAXATION IN A MAGNETIC RECORDING SYSTEM

[75] Inventors: Klaas B. Klaassen; Jacobus C. L. van Peppen, both of San Jose, Calif.

[73] Assignee: International Business Machines Corporation, Armonk, N.Y.

[21] Appl. No.: 517,783

[22] Filed: May 2, 1990

[51] Int. Cl.⁵ .......................... G11B 5/09; G11B 5/02
[52] U.S. Cl. ........................................ 360/46; 360/68
[58] Field of Search ................ 360/46, 68, 61, 62

[56] References Cited

U.S. PATENT DOCUMENTS

| | | | |
|---|---|---|---|
| 3,009,637 | 11/1961 | Floros | 360/50 |
| 3,618,119 | 11/1971 | Rodriguez | 360/46 |
| 4,428,008 | 1/1984 | Fawkes | 360/61 |
| 4,649,447 | 3/1987 | Huang et al. | 360/113 |
| 4,651,235 | 3/1987 | Morita et al. | 360/46 |
| 5,067,032 | 11/1991 | Ida | 360/46 |

FOREIGN PATENT DOCUMENTS 0235672  4/1945  Switzerland .......................... 360/44

OTHER PUBLICATIONS

V. C. Martin, Full Erasure of Interblock Gap Between Records on Magnetic Tape, IBM TDB, Jul. 1972, vol. 15, No. 2, pp. 641–642.

*Primary Examiner*—Aristotelis Psitos
*Assistant Examiner*—Won Tae C. Kim
*Attorney, Agent, or Firm*—David J. Kappos

[57] ABSTRACT

A magetic recording system includes a current-tapering circuit which gradually reduces the WRITE current in a magnetic recording head to zero over a time interval on the same order of magnitude as the characteristic relaxation time of the domain patterns in the magnetic recording head, rather than abruptly. Specific embodiments of the current-tapering circuit create a down-sloping ramp, a decaying exponential curve, and a high-frequency burst. The resultant magnetic recording system has reduced Barkhausen noise and reproducible READ performance as well as improved READ sensitivity following a WRITE operation.

23 Claims, 4 Drawing Sheets

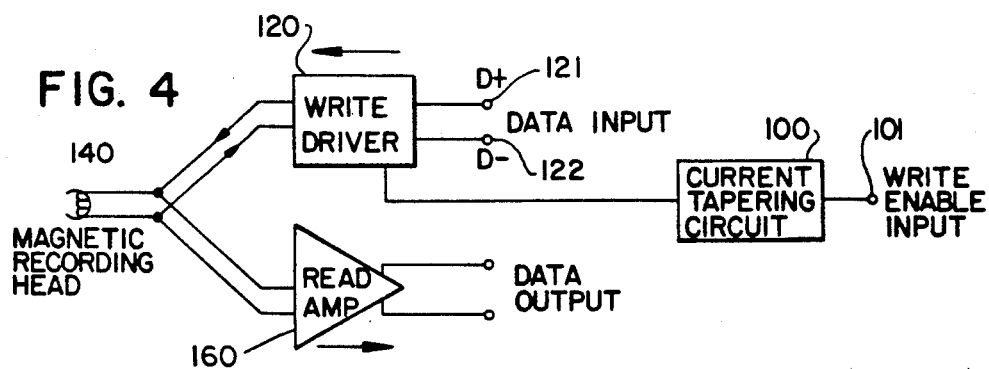
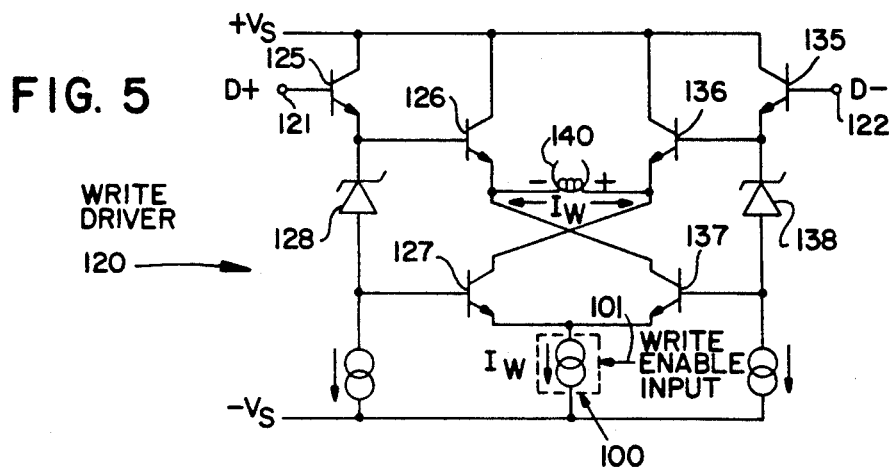
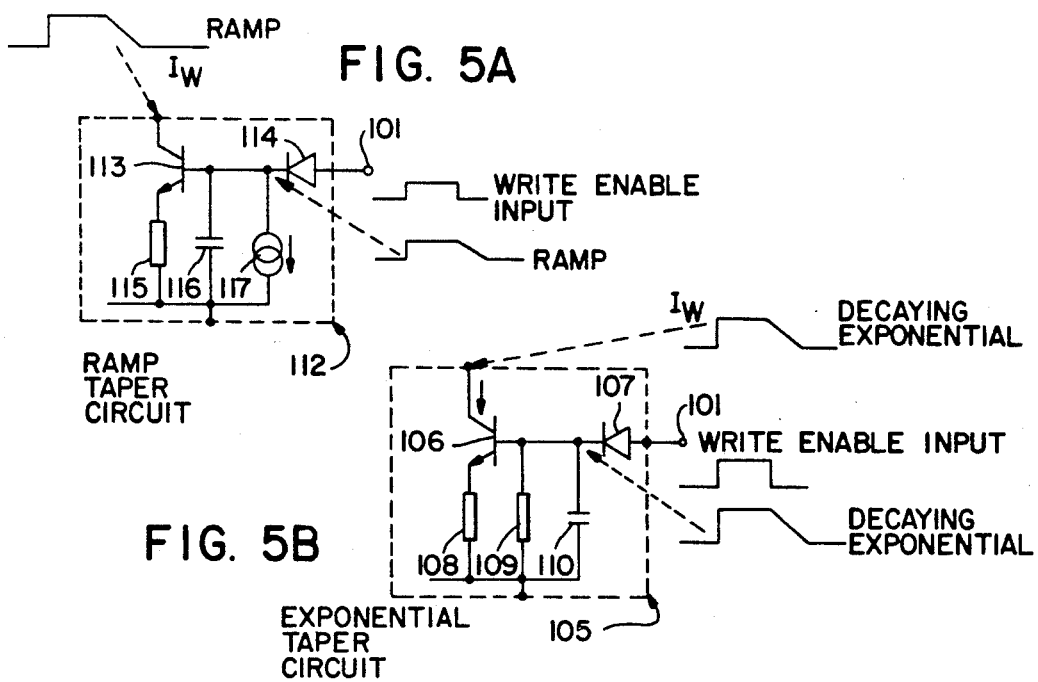

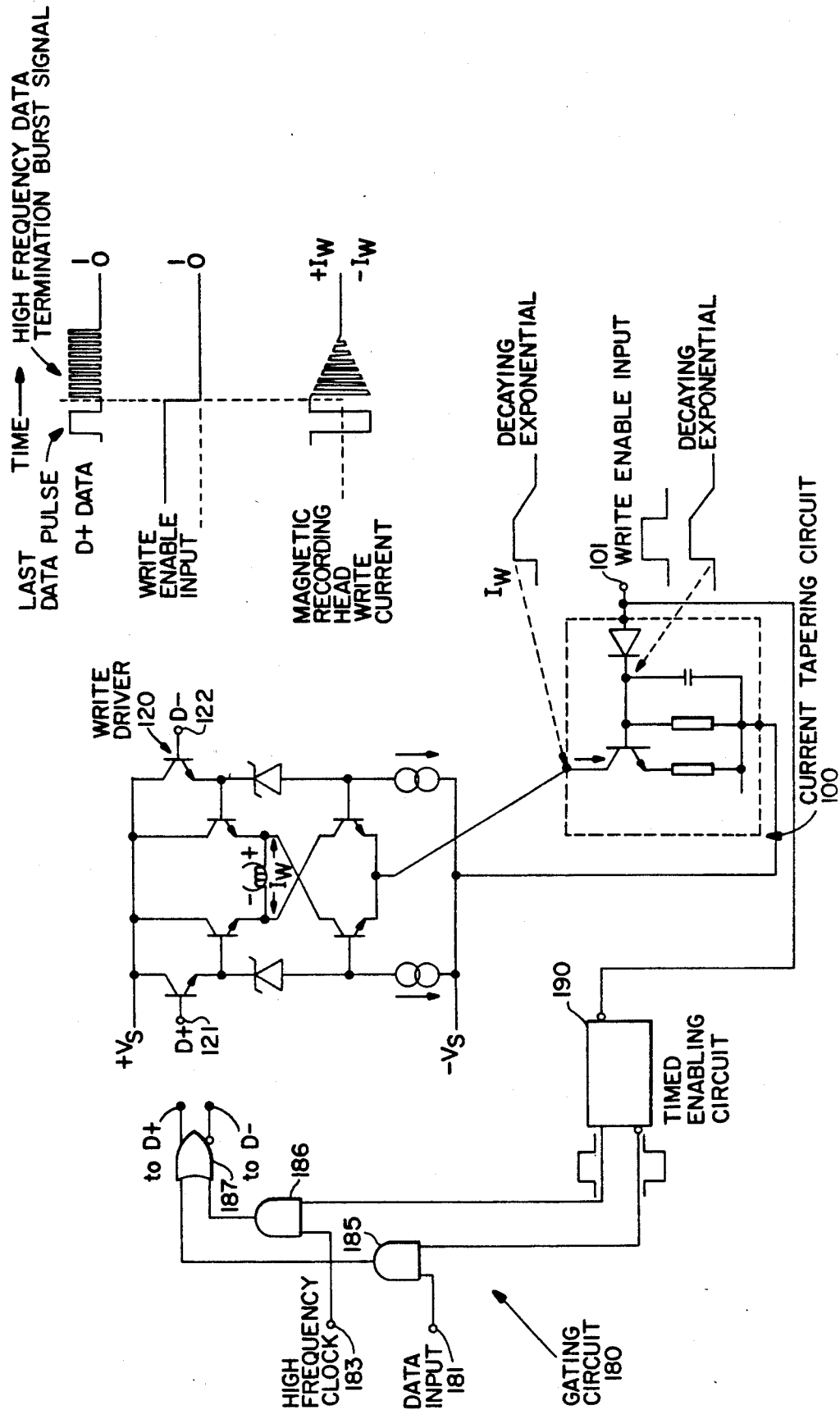

CONTROLLED MAGNETIC RECORDING HEAD RELAXATION IN A MAGNETIC RECORDING SYSTEM

This invention relates in general to magnetic recording systems, and in particular to control of the magnetic relaxation of magnetic recording heads used in such systems.

BACKGROUND OF THE INVENTION

The recent evolution of magnetic storage technology has included dramatic improvements in magnetic storage medium density and data access times. In order to service the increased density and shorter access times, magnetic recording heads are being called upon to perform their writing and reading functions, as well as their servo signal reading functions, more rapidly. This in turn requires closer timing between successive data transfer operations, or WRITE cycles and READ cycles (both data and servo position signal), which puts stringent requirements on the rapid magnetic relaxation of the magnetic recording head.

However, in prior art magnetic recording systems such as that shown in FIGS. 1 and 2, the relaxation of the magnetic recording head after a WRITE cycle is a highly hysteretic, magnetically irreversible process. This is because when the WRITE ENABLE input deactivates the WRITE DRIVER and thereby abruptly removes the WRITE current from the magnetic recording head, metastable magnetic domain patterns (i.e., marginally stable magnetic patterns) are created in the head which can transition to lower energy states (i.e. relax further) at random points in time after termination of the WRITE process. The associated abrupt transitions in the magnetization of the magnetic recording head results in flux changes threading the magnetic recording head and thereby creating voltage glitches in the, head output. These relaxation glitches, known as Barkhausen noise, can occur for several hundred microseconds following a WRITE cycle, and cause errors in any data or servo signal read during that time.

Additionally, the domain walls, which define the boundaries between the domain patterns, form at different locations and lead to a different, nonzero, final remanence of the head every time the WRITE current is removed from the magnetic recording head. Thus, not only is a given final micro-magnetic domain pattern not reproducible from one WRITE cycle to the next, but the final remanence state of the magnetic recording head is nonzero. As a result, prior art magnetic recording systems exhibit non-reproducible data and servo read performance (due to randomness of the final micromagnetic domain pattern), impaired READ sensitivity following a WRITE cycle (due to nonzero final remanence), and noise-after-WRITE which can produce errors in data and servo READ cycles immediately following a WRITE cycle.

All of the adverse magnetic relaxation effects described above occur in ferrite inductive heads, thin film inductive heads, and thin-film inductive-magnetoresistive heads. Moreover, while observable in standard dual element READ/WRITE magnetic heads, the problems become particularly acute in the single element READ/WRITE magnetic heads that must be used to achieve the alignment accuracy concomitant to increased storage density. Thus, the described magnetic relaxation effects have heretofore detracted from the performance of READ/WRITE magnetic heads and have presented a barrier to reduction of the transition time between WRITE and READ cycles.

OBJECTS OF THE INVENTION

It is therefore an object of the present invention to control magnetic recording head relaxation in a magnetic recording system.

It is another object of the present invention to reduce READ/WRITE magnetic recording head noise following a WRITE cycle in a magnetic recording system.

It is another object of the present invention to reproduce a final micro-magnetic domain state following a WRITE cycle in a magnetic recording system.

It is another object of the present invention to attain a final remanence state of zero in a magnetic recording head of a magnetic recording system.

It is another object of the present invention to control magnetic recording head relaxation in both a single element and a dual element READ/WRITE magnetic recording system.

It is another object of the present invention to control magnetic recording head relaxation in a ferrite inductive, a thin film inductive, and a thin-film inductive-magnetoresistive magnetic recording system.

These and other objects will become more apparent when read in light of the following specification and drawings.

SUMMARY OF THE INVENTION

In accordance with the invention, a magnetic recording system includes a current tapering circuit which gradually reduces the WRITE current in a magnetic recording head to zero over a time interval on the same order of magnitude (i.e., within a factor of ten) as the characteristic relaxation time of the domain walls in the magnetic recording head (approximately 100–300 ns), rather than abruptly (approximately 1–10 ns). The "characteristic relaxation time" of the domain walls is the time required for the magnetic patterns in the magnetic recording head to reach their final (lowest) energy state. This time is dependent on the physical properties (material, geometry, etc.) associated with a particular magnetic recording head design, and may be empirically measured from a given magnetic recording head.

One effect of this quasi-static, controlled relaxation of the magnetization in the magnetic recording head is that the head returns to a fully relaxed state in a shorter period of time than otherwise. A second effect of controlled relaxation is that after the WRITE current is reduced to zero the magnetic recording head creates far fewer Barkhausen noise glitches than otherwise, and thus causes far fewer errors in data servo information read directly after a WRITE cycle. A third effect of controlled relaxation is that the magnetic recording head relaxes into a final micro-magnetic domain state that is reproducible from one WRITE cycle to the next, and thus provides constant data read performance from one WRITE cycle to the next. A fourth effect of controlled relaxation is that the magnetic recording head relaxes into a final remanence state of zero, and thus provides improved READ sensitivity directly after a WRITE cycle.

The current-tapering circuit extends the fall-time of the WRITE current through the magnetic recording head according to a smoothly decaying function. Preferred embodiments include monotonically decaying functions such as a down-sloping ramp and a decaying exponential curve. Alternative embodiments include a high frequency (i.e. a frequency above the recording frequency band) burst function such as a square wave burst or a sinusoidal wave burst whose amplitudes have a smoothly decaying function. The high frequency of the burst prevents the magnetic recording head from writing to the magnetic storage medium while the WRITE current is gradually falling.

BRIEF DESCRIPTION OF THE DRAWINGS

FIG. 4 is a block diagram showing a magnetic recording system embodying the present invention.

FIG. 5 is a schematic diagram showing circuit details of a WRITE DRIVER embodying the present invention. FIG. 5A and FIG. 5B show circuit details of current tapering circuits that may be incorporated into the WRITE DRIVER of FIG. 5.

FIG. 8 is a schematic diagram showing circuit details of a WRITE DRIVER with an alternative embodiment of the present invention.

FIG. 9 is a timing diagram showing the interaction of inputs and outputs in a WRITE DRIVER with an alternative embodiment of the present invention.

DESCRIPTION OF THE PREFERRED EMBODIMENT

Figure 1:
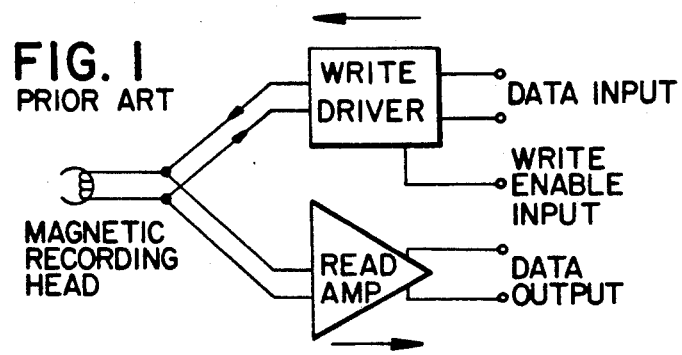
FIG. 1 is a block diagram showing a magnetic recording system of the prior art.
Figure 2:
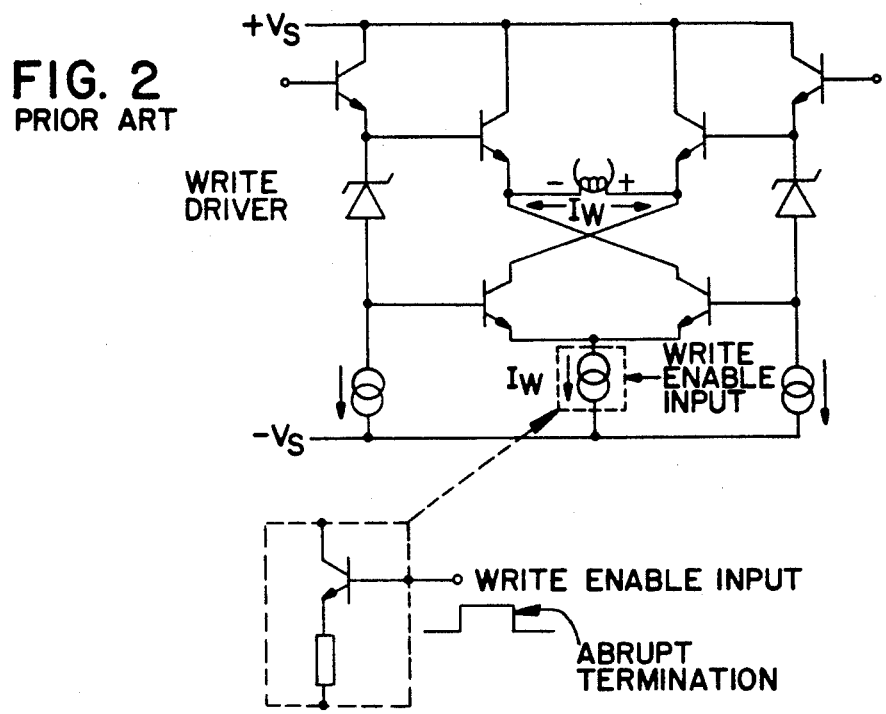
FIG. 2 is a schematic diagram showing circuit details of a WRITE DRIVER of the prior art.
Figure 3:
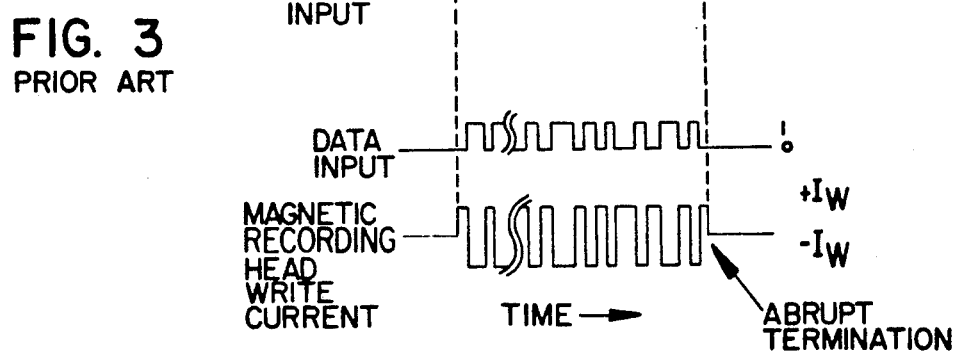
FIG. 3 is a timing diagram showing the interaction of inputs and outputs in a WRITE DRIVER of the prior art.

FIGS. 1-3 illustrate in block diagram, schematic diagram, and timing diagram form a typical prior art magnetic recording head and WRITE DRIVER, wherein the WRITE current at the completion of a WRITE cycle is abruptly terminated, resulting in adverse magnetic relaxation effects as described in the background of the invention.

FIG. 4 illustrates in block diagram form a magnetic recording system embodying the present invention. As shown, the system comprises a magnetic recording head 140, a WRITE DRIVER 120, a current tapering circuit 100, and a READ AMPLIFIER 160. A typical data transfer sequence begins when external circuitry raises the WRITE ENABLE input 101 from logic state 0 to logic state 1. The current tapering circuit 100 passes the WRITE ENABLE input 101 with negligible delay to the WRITE DRIVER 120. Next, external circuitry supplies logic levels representing binary data to the D+ and D− (121 and 122 respectively) inputs of the WRITE DRIVER 120. The WRITE DRIVER 120 translates the D+ and D− logic states into current pulses through the magnetic recording head 140. The current flowing through the magnetic recording head 140 creates a magnetic field which magnetizes the appropriate portion of a magnetic recording medium (not shown) adjacent the magnetic recording head 140. The WRITE cycle then continues, with the WRITE ENABLE input 101 maintained at logic state 1 and the D+ and D− inputs toggling to create the appropriate magnetic recording head current and associated magnetic field, thus writing perhaps millions of bits of data to the magnetic storage medium.

When the WRITE cycle portion of the data transfer sequence is complete, external circuitry generates a completion signal indicating completion of the WRITE operation, which drops the WRITE ENABLE input 101 from logic state 1 to logic state 0. The current tapering circuit 100, however, does not pass the abrupt transition to the WRITE DRIVER 120. Instead, its output to the WRITE DRIVER 120 is a smooth ramp function decaying to 0 over a time interval on an order of magnitude equal to the characteristic relaxation time associated with the domain walls in the magnetic recording head. As the WRITE ENABLE input 101 to the WRITE DRIVER 120 decays smoothly to 0, the current delivered from the WRITE DRIVER 120 to the magnetic recording head 140 likewise decays smoothly to 0 over the same time interval, which time interval, previously derived from measurement of the characteristic relaxation time of the domain walls in the magnetic recording head, results in greatly diminished Barkhausen noise, relaxation into a reproducible micro-magnetic domain state, and a final remanence state of zero.

The WRITE cycle now being completed, the data transfer sequence may also be complete, or alternatively it may continue in the form of a subsequent WRITE cycle or READ cycle. In the case where a READ cycle follows the just-completed WRITE cycle, the data transfer sequence continues with external circuitry gating the READ AMP 160 data outputs to begin reading data from the magnetic storage medium as appropriate. Data integrity is assured throughout the READ cycle, since the adverse magnetic relaxation effects which would otherwise be generated by the magnetic recording head at the completion of the WRITE cycle have been corrected by the ramped termination of the WRITE DRIVER 120 current. Once the desired data has been read, the READ cycle is complete and the data transfer sequence may likewise be concluded. The entire process may then repeat itself by way of another data transfer sequence.

FIGS. 5, 5A, and 5B illustrate in schematic diagram form a WRITE DRIVER embodying the present invention. As shown, the system comprises a WRITE DRIVER 120 with an embedded current tapering circuit including either a means for reducing the current in the magnetic recording head 140 according to an exponentially decaying function (e.g., an exponential taper circuit 105 as in FIG. 5B) or a means for reducing the current in the magnetic recording head according to a linear ramp function (e.g., a ramp taper circuit 112 as in FIG. 5A).

A WRITE cycle begins when the WRITE ENABLE input 101 transitions from logic state 0 to logic state 1. In either the ramp taper circuit 112 or the exponential taper circuit 105, the diode (114 or 107, respectively) begins conducting, rapidly charging the capacitor (116 or 110, respectively) and turning the transistor (113 or 106, respectively) ON. At this point, the WRITE DRIVER 120 is enabled, and the D+ and D− (121 and 122) inputs begin to control the WRITE current applied to the magnetic recording head 140. When D+ is at logic 1 (and hence D− at logic 0), transistors 126 and 127 are ON, while transistors 136 and 137 are OFF. The WRITE current Iw flows through the magnetic recording head 140 from (−) to (+). When D− is at logic 1

(and hence D+ at logic 0), transistors 136 and 137 are ON, while transistors 126 and 127 are OFF. The WRITE current Iw flows through the magnetic recording head 140 from (+) to (−). Transistors 125 and 135 are emitter followers biased by a constant rail current and as such they are always on. The output of each emitter follower tracks the input signal (D+ or D−, respectively), with an offset equal to the base emitter voltage.

At the completion of the WRITE cycle, the WRITE ENABLE input 101 drops abruptly from logic state 1 to logic state 0 in response to an externally generated completion signal indicating completion of the WRITE operation. In one preferred embodiment of the present invention, where the ramp taper circuit 112 shown in FIG. 5A is embedded in the WRITE DRIVER, the diode 114 ceases to conduct. The capacitor 116 begins discharging through the constant current source 117. The voltage on the base of transistor 113 ramps linearly to 0 according to the time constant determined by the values of capacitor 116 and constant current source 117, which values are set to create a ramp reaching 0 potential at a time approximately equal to the characteristic relaxation time associated with the domain walls of the magnetic recording head 140 used in the WRITE DRIVER 120. As the capacitor 116 connected to the base of transistor 113 discharges, the WRITE current Iw through transistor 113 likewise ramps linearly to 0, thereby providing controlled relaxation of the magnetic recording head 140.

In another preferred embodiment of the present invention, where the exponential taper circuit 105 shown in FIG. 5B is embedded in the WRITE DRIVER 120, the completion of the WRITE cycle occurs in substantially the same manner as described above. However, in this embodiment the capacitor 110 discharges along a decaying exponential curve through resistor 109 according to a time constant determined so as to create an exponential function decaying to approximately 0 potential at a time approximately equal to the characteristic relaxation time associated with the domain walls of the magnetic recording head 140 used in the WRITE DRIVER 120.

Figure 6:
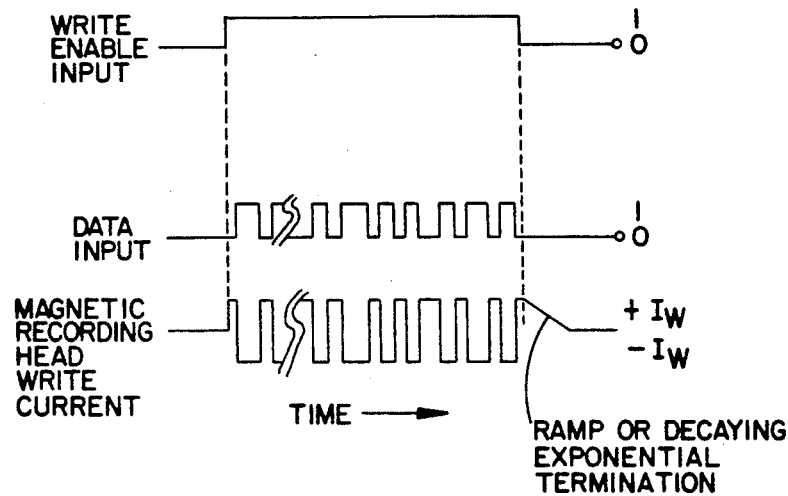
FIG. 6 is a timing diagram showing the interaction of inputs and outputs in a WRITE DRIVER embodying the present invention.

FIG. 6 illustrates in timing diagram form the interaction of inputs and outputs in a WRITE DRIVER embodying the present invention. As discussed above, the critical period of time with respect to magnetic relaxation occurs when the WRITE ENABLE transitions from logic state 1 to logic state 0. At that point in the WRITE cycle, the current tapering circuit 100 of the present invention creates a smooth, elongated fall time to the WRITE current through the magnetic recording head 140. As shown, current is tapered according to either a linear ramp function or a decaying exponential function.

Figure 7:
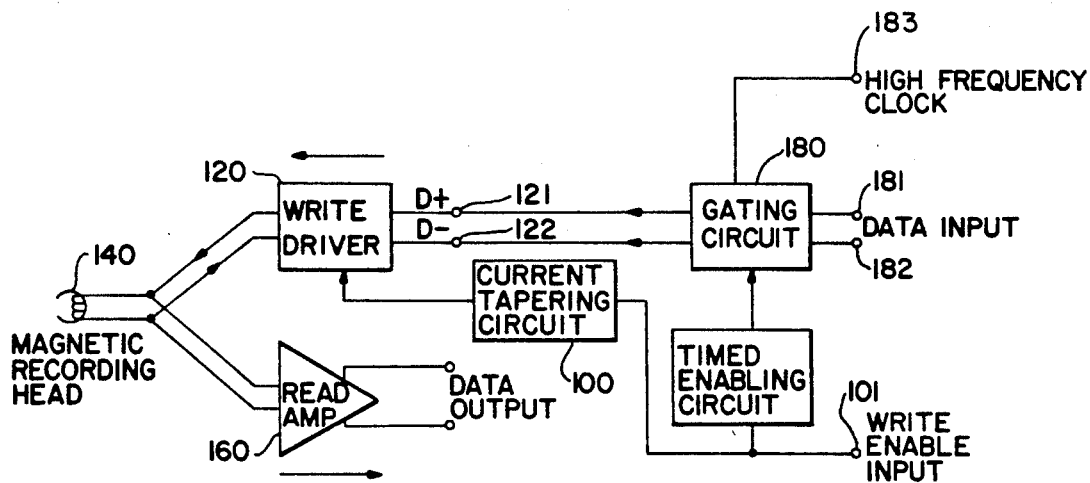
FIG. 7 is a block diagram showing a magnetic recording system with an alternative embodiment of the present invention.

FIGS. 7, 8, and 9 show respectively in block diagram, schematic diagram, and timing diagram form a magnetic recording system comprising an alternative embodiment of the present invention. As shown in FIGS. 7 and 8, this alternative embodiment includes a WRITE DRIVER 120 and a current tapering circuit 100 such as either of those described above in the preferred embodiments and illustrated in FIG. 5A or FIG. 5B. In addition, the alternative embodiment employs a timed enabling circuit 190 and a gating circuit 180. The final enabling circuit 190 is triggered by the negative-going transition of the WRITE ENABLE input 101 to provide an enabling signal to the gating circuit 180 for a predetermined period of time. Upon enablement, the gating circuit provides a high frequency data termination burst signal on the D+ and D− inputs (121 and 122) to the WRITE DRIVER 120.

FIG. 8 shows the particulars of the timed enabling circuit 190 and the gating circuit 180. Upon a logic state 1 to logic state 0 transition of the WRITE ENABLE input 101, the timed enabling circuit 190 (a monostable multivibrator, for instance) causes the gating circuit 180 to degate the data input 181 and gates the high frequency clock 183 to the D+ and D− inputs (121 and 122) of the WRITE DRIVER 120. The burst signal from the high frequency clock 183 is maintained on the D+ and D− inputs 121 and 122 for a period of time determined by the timed enabling circuit 190, which period is set such that the high frequency burst signal is gated to the WRITE DRIVER 120 during the same period of time the WRITE current Iw is ramping (or decaying) to 0. Upon expiration of the set time period, the timed enabling circuit 190 causes the gating circuit 180 to degate the high frequency clock 183 and regate the data input 181 to the D+ and D− inputs 121 and 122 of the WRITE DRIVER 120.

As illustrated in FIG. 9, the high frequency data termination burst signal coacts with the smooth ramp (or decaying exponential) of the current tapering circuit to provide a high frequency linearly (or exponentially) terminating WRITE current through the magnetic recording head.

It is worthy of note that there exist many possible variations on the above described alternative embodiment. For instance, the timed enabling circuit 190 may be a monostable multivibrator, or, it may be a counter that counts the number of pulses in the burst signal and degates the high frequency clock after a given count is reached. The high frequency clock 183 may be replaced with a high frequency sinusoidal wave. Also, either the high frequency clock or the high frequency sinusoidal wave may be replaced with a low frequency-to-high frequency square wave or sinusoidal wave. Any of these functions, in coaction with monotonically (i.e. linearly or exponentially) decaying taper circuit whose time constant is at least as long as the characteristic relaxation time of the domain walls in the driven magnetic recording head, will provide a dramatic improvement in the adverse magnetic relaxation effects created by the magnetic recording head at WRITE cycle completion.

Further, the present invention is readily applicable to a wide variety of magnetic recording systems. For instance, it can be used in systems having ferrite inductive heads, in systems having thin film inductive heads, and in systems having thin film inductive-magnetoresistive in systems implementing single element READ/WRITE heads and in systems implementing dual element READ/WRITE heads.

While the invention has been particularly described and illustrated with reference to preferred embodiments, it will be understood by those skilled in the art that changes in the description or illustrations may be made with respect to form or detail without departing from the spirit and scope of the invention.

What is claimed is:

1. A magnetic recording system having controlled magnetic recording head relaxation at the conclusion of a WRITE cycle, comprising:

a magnetic recording head for carrying a current for use in writing to a magnetic storage medium, said magnetic recording head having domain patterns with a characteristic relaxation time, said characteristic relaxation time corresponding to a time required for magnetic patterns in said magnetic recording head to reach their final energy state;

a WRITE DRIVER, coupled to said magnetic recording head;

means for signaling completion of said WRITE cycle, said WRITE cycle including a plurality of current pulses applied to said magnetic recording head; and a current tapering circuit, responsive to said completion of said WRITE cycle, for increasing the fall time of said current in said magnetic recording head such that said current falls gradually over a time interval ranging within an order of magnitude of said characteristic relaxation time of said domain patterns.

2. A magnetic recording system as recited in claim 1, wherein said means for increasing the fall time of said current provides a fall time according to a function monotonically decreasing in time.

3. A magnetic recording system as recited in claim 1, wherein said current falls gradually over a time interval approximately equal to said characteristic relaxation time of said domain patterns.

4. A magnetic recording system having controlled magnetic recording head relaxation at the conclusion of a WRITE cycle, comprising:

a magnetic recording head for carrying a current for use in writing to a magnetic storage medium, said magnetic recording head having domain patterns with a characteristic relaxation time, said characteristic relaxation time corresponding to a time required for magnetic patterns in said magnetic recording head to reach their final energy state;

a WRITE DRIVER, coupled to said magnetic recording head; and a current tapering circuit having an output coupled to said WRITE DRIVER and an input coupled to a WRITE ENABLE input, said current tapering circuit responsive to said WRITE ENABLE input indicating completion of said WRITE cycle, said WRITE cycle including a plurality of current pulses applied to said magnetic recording head, said current tapering circuit reducing said current in said magnetic recording head gradually over a time interval ranging within an order of magnitude of said characteristic relaxation time of said domain patterns.

5. A magnetic recording system as recited in claim 4, wherein said current tapering circuit includes means for reducing said current according to an exponentially decaying function.

6. A magnetic recording system as recited in claim 4, wherein said current tapering circuit comprises a diode with its anode coupled to said WRITE ENABLE input, a capacitor coupled between said diode's cathode and a reference voltage, a resistor coupled in parallel with said capacitor between said diode's cathode and said reference voltage, a transistor with its base coupled to said diode's cathode and its emitter coupled through a resistor to said reference voltage, said transistor functioning to control said current delivered by said WRITE DRIVER to said magnetic head.

7. A magnetic recording system as recited in claim 4, wherein said current tapering circuit includes means for reducing said current according to a linear ramp function.

8. A magnetic recording system as recited in claim 7, wherein said current tapering circuit comprises a diode with its anode coupled to said WRITE ENABLE input, a capacitor coupled between said diode's cathode and a reference voltage, a constant current source coupled between said diode's cathode and said reference voltage, a transistor with its base coupled to said diode's cathode and its emitter coupled through a resistor to said reference voltage, said transistor functioning to control said current delivered by said WRITE DRIVER to said magnetic recording head.

9. A magnetic recording system as recited in claim 4, further comprising means for providing a high frequency sinusoidal wave burst to said WRITE DRIVER, and wherein said current tapering circuit includes first means for reducing said current according to a high frequency sinusoidal wave burst monotonically decaying in time.

10. A magnetic recording system as recited in claim 9, wherein said current tapering circuit further includes second means for providing a signal in the form of any of a decaying linear function and a decaying exponential function and wherein said first means is a means for reducing said current according to a high frequency sinusoidal wave burst decaying in time according to any of said linear function and said exponential function.

11. A magnetic recording system as recited in claim 9, wherein said high frequency sinusoidal wave burst is created by circuitry comprising:

a timed enabling circuit coupled to said WRITE ENABLE input, responsive to said WRITE ENABLE input indicating completion of said WRITE cycle, for generating a timed enabling signal for a pre-determined period of time; and a gating circuit coupled to said timed enabling circuit, responsive to said enabling signal from said timed enabling circuit, for applying a high frequency sinusoidal wave current to said magnetic head while enabled by said enabling signal.

12. A magnetic recording system as recited in claim 4, further comprising means for providing a high frequency square wave burst to said WRITE DRIVER, and wherein said current tapering circuit includes a means for reducing said current according to a high frequency square wave burst monotonically decaying in time.

13. A magnetic recording system as recited in claim 12, wherein said high frequency square wave burst is created by circuitry comprising:

a timed enabling circuit coupled to said WRITE ENABLE input, responsive to said WRITE ENABLE input indicating completion of said WRITE cycle, for generating a timed enabling signal for a pre-determined period of time; and a gating circuit coupled to said timed enabling circuit, responsive to said enabling signal from said timed enabling circuit, for applying a high frequency square wave current to said magnetic head while enabled by said enabling signal.

14. A magnetic recording system as recited in claim 4, wherein said magnetic recording head is a single element READ/WRITE magnetic recording head.

15. A magnetic recording system as recited in claim 4, wherein said magnetic recording head is a dual element READ/WRITE magnetic recording head.

16. A magnetic recording system as recited in claim 4, wherein said magnetic recording head is a thin film inductive head.

17. A magnetic recording system as recited in claim 4, wherein said magnetic recording head is a ferrite inductive head.

18. A magnetic recording system as recited in claim 4, wherein said current tapering circuit reduces said current gradually over a time interval approximately equal to said characteristic relaxation time of said domain patterns.

19. A magnetic recording system as recited in claim 4, further comprising a READ AMPLIFIER, coupled to said magnetic recording head.

20. A method for controlling magnetic relaxation following a WRITE cycle of a READ/WRITE magnetic recording head having domain patterns with a characteristic relaxation time, said characteristic relaxation time corresponding to a time required for magnetic patterns in said magnetic recording head to reach their final energy state, comprising:

applying a WRITE current to said magnetic recording head to perform a WRITE cycle, said WRITE cycle including a plurality of current pulses;

receiving a signal indicating the completion of said WRITE cycle; and upon said receipt, gradually reducing said WRITE current in said magnetic recording head over a time interval ranging within an order of magnitude of said characteristic relaxation time of said domain patterns.

21. A method for controlling magnetic relaxation as recited in claim 20, wherein said time interval is approximately equal to said characteristic relaxation time of said domain patterns.

22. A method for controlling magnetic relaxation following a WRITE cycle of a READ/WRITE magnetic recording head, said magnetic recording head having domain patterns with a characteristic relaxation time, said characteristic relaxation time corresponding to a time required for magnetic patterns in said magnetic recording head to reach their final energy state, comprising:

applying a WRITE ENABLE signal to a WRITE DRIVER coupled to said magnetic recording head;

in response to said WRITE ENABLE signal, applying a WRITE current from said WRITE DRIVER to said magnetic recording head to perform a WRITE cycle, said WRITE cycle including a plurality of current pulses;

discontinuing said WRITE ENABLE signal to said WRITE DRIVER; and in response to said discontinuance of said WRITE ENABLE signal, gradually reducing said WRITE current in said magnetic recording head over a time interval ranging within an order of magnitude of said characteristic relaxation time of said domain patterns.

23. A method for controlling magnetic relaxation as recited in claim 22, wherein said time interval is approximately equal to said characteristic relaxation time of said domain patterns.

* * * * *